United States Patent
Madhav et al.

(10) Patent No.: US 10,365,546 B1
(45) Date of Patent: Jul. 30, 2019

(54) VEHICLE PROJECTION SYSTEM AND METHOD OF USING

(71) Applicant: The Boeing Company, Chicago, IL (US)

(72) Inventors: Jagdish T. Madhav, Bothell, WA (US); John Christiaan Beckman, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/954,145

(22) Filed: Apr. 16, 2018

(51) Int. Cl.
| | |
|---|---|
| *G03B 21/14* | (2006.01) |
| *G03B 23/10* | (2006.01) |
| *B60Q 3/60* | (2017.01) |
| *B60Q 3/43* | (2017.01) |
| *B60Q 1/50* | (2006.01) |
| *G03B 23/12* | (2006.01) |

(52) U.S. Cl.
CPC ............. *G03B 21/147* (2013.01); *B60Q 1/50* (2013.01); *B60Q 3/43* (2017.02); *B60Q 3/60* (2017.02); *G03B 23/105* (2013.01); *G03B 23/12* (2013.01)

(58) Field of Classification Search
CPC ...... G03B 21/001; G03B 21/10; G03B 21/12; G03B 21/64; G03B 21/147; G03B 21/2033; G03B 23/12; G03B 23/105; B60Q 3/43; B60Q 3/60
See application file for complete search history.

(56) References Cited

U.S. PATENT DOCUMENTS

| | | | |
|---|---|---|---|
| 2,189,285 A | 2/1940 | Gruber | |
| 2,758,235 A | 8/1956 | Evans, Jr. | |
| 4,455,067 A * | 6/1984 | Hoppmann | G03B 21/001 353/69 |
| 4,832,482 A * | 5/1989 | Kallenberg | G03B 15/10 353/108 |
| 7,455,444 B2 | 11/2008 | Chien | |
| 7,832,917 B2 | 11/2010 | Chien | |
| 7,871,192 B2 | 1/2011 | Chien | |
| 8,083,377 B2 | 12/2011 | Chien | |
| 8,128,274 B2 | 3/2012 | Chien | |
| 8,398,246 B2 | 3/2013 | Rutledge et al. | |
| 8,545,026 B2 | 10/2013 | Wang | |
| 8,599,483 B1 | 12/2013 | Weber et al. | |
| 8,648,291 B2 | 2/2014 | Tanis-Likkel et al. | |
| 9,459,521 B2 * | 10/2016 | Bauer | B64D 11/0015 |
| 9,731,824 B2 | 8/2017 | Madhav | |
| 2005/0140941 A1 * | 6/2005 | Maddock | G03B 21/10 353/119 |
| 2008/0012728 A1 * | 1/2008 | Heym | B64D 11/0015 340/945 |
| 2008/0164419 A1 | 7/2008 | Johnston et al. | |
| 2010/0201949 A1 * | 8/2010 | Barnett | G03B 25/00 352/101 |

(Continued)

*Primary Examiner* — Sultan Chowdhury
(74) *Attorney, Agent, or Firm* — Parsons Behle & Latimer

(57) ABSTRACT

An image projection system (10) having a projector (12) having an interchangeable optical slide holder (14) configured to adaptively focus an object slide (20) onto a surface (16, 42) of a vehicle (17). The system includes an image management system (18) associated with the projector. The image management system is for selectively associating one object slide at a time with the interchangeable optical slide holder for projection of the selected object slide (20*a*) upon the surface.

13 Claims, 5 Drawing Sheets

(56) References Cited

U.S. PATENT DOCUMENTS

2015/0070595 A1* 3/2015 Chien ................. F21S 9/02
349/5
2017/0192345 A1* 7/2017 Somashankarappa .....................
G03B 23/105

* cited by examiner

VEHICLE PROJECTION SYSTEM AND METHOD OF USING

FIELD OF THE DISCLOSURE

Disclosed embodiments relate generally to optical systems and methods for communicating information on or around a vehicle. More particularly, disclosed embodiments relate to economical optical systems and methods for compensating for image distortions, such as the Keystone effect, when communicating information on, or around, a vehicle.

BACKGROUND

Vehicles, especially mass-transit vehicles, such as aircraft, busses, passenger railways, subways, trams, ships, ferries, or the like, often use projected images to communicate information to the passengers. However, the surfaces on, and in, vehicles are often curved, or otherwise irregular, making projection of an image problematic. Dynamic projection systems and methods exist to compensate for the curvatures or irregularities, but they are often costly and complicated. Additionally, existing dynamic projection systems are relatively heavy and bulky and take up substantial space on the vehicle. Other drawbacks and disadvantages of existing systems also exist.

SUMMARY

Accordingly, disclosed embodiments address or overcome the above-noted, and other, drawbacks and disadvantages of existing systems. Other advantages of the disclosed embodiments also exist.

Disclosed embodiments include an image projection system having a projector having an interchangeable optical slide holder configured to adaptively focus an object slide onto a surface of a vehicle. The system includes an image management system associated with the projector. The image management system is for selectively associating one object slide at a time with the interchangeable optical slide holder for projection of the selected object slide upon the surface.

Disclosed embodiments also include an interchangeable optical slide holder further having a lens configured with a projection axis that is different from a plane of the selected object slide and a lens plane. Embodiments of the interchangeable optical slide holder compensate for the Keystone effect.

In some disclosed embodiments, the surface upon which the final scene is projected is one of a bulkhead, or a non-planar surface, and the vehicle is a high-capacity passenger conveyance. Disclosed embodiments of the high-capacity passenger conveyance include an aircraft, a ship, a train, or a bus.

In some disclosed embodiments, the object slide includes an undistorted image that is perceivable by a human prior to selection. In some disclosed embodiments, the image management system retains object slides in one of a linear sequence, or a recirculating sequence.

In some disclosed embodiments, the object slide includes a purposefully distorted image that is perceivable by a human prior to selection. In some disclosed embodiments, the image management system retains object slides in one of a linear sequence, or a recirculating sequence.

Also disclosed are methods of projecting an image, including projecting an object slide with a projector having an interchangeable optical slide holder configured to adaptively focus the object slide onto a surface of a vehicle. The methods include managing the projecting of the image with an image management system associated with the projector. The image management system is for selectively associating one object slide at a time with the interchangeable optical slide holder for projection of the selected image upon the surface.

Disclosed embodiments of the methods include an interchangeable optical slide holder having a lens configured to project with a projection axis that is different from a plane of the selected object slide and a lens plane. In some embodiments, the methods include compensating with the interchangeable optical slide holder for the Keystone effect.

In some disclosed embodiments, the method includes projecting the final scene onto a surface that is one of a bulkhead, or a non-planar surface, and wherein the vehicle is a high-capacity passenger conveyance. In some embodiments, the high-capacity passenger conveyance is one of an aircraft, a ship, a train, or a bus.

In some disclosed embodiments, the methods include an object slide having an undistorted image that is perceivable by a human prior to selection. In some disclosed embodiments, the object slide includes a purposefully distorted image that is perceivable by a human prior to selection. In some disclosed embodiments, the methods include retaining the object slides in the image management system in one of a linear sequence, or a recirculating sequence.

Disclosed embodiments also include a projection system having a projector having a light source, an object slide, and a lens. The system includes an image management system that selectively positions the object slide between the light source and the lens for projection of a final scene onto a surface.

Disclosed embodiments of the system include a lens that is focusable and tiltable. In some embodiments, the object slide further includes a disk of a plurality projectable object slides, and the image management system controls a position of the disk to selectively position one of the plurality of projectable object slides between the light source and the lens for projection onto the surface. In some embodiments, the plurality of projectable object slides are shaped to compensate for the Keystone effect.

In some disclosed embodiments, the object slide further includes a linear array of a plurality projectable object slides, and the image management system controls a position of the linear array to selectively position one of the plurality of projectable object slides between the light source and the lens for projection onto the surface. In some embodiments, the plurality of projectable object slides are shaped to compensate for the Keystone effect.

Figure 1:
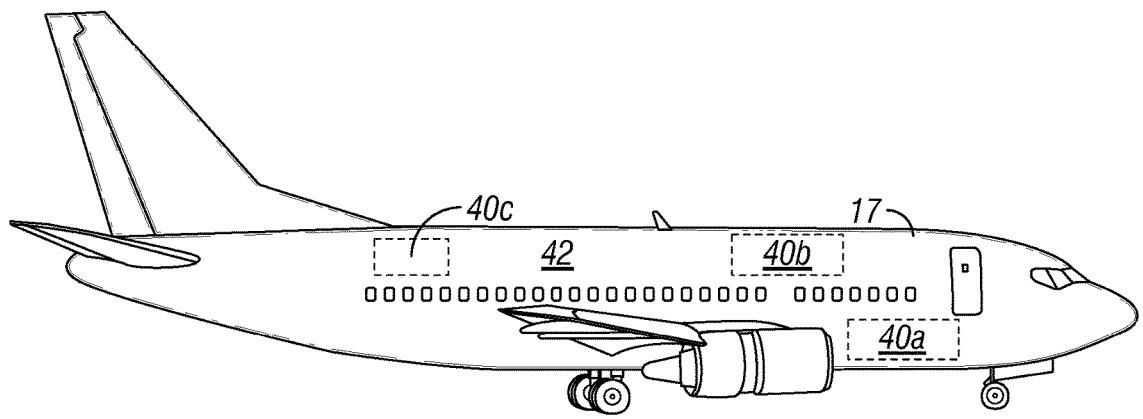
FIG. 1 is an exemplary illustration of a passenger vehicle with final scenes displaying information on the outside surfaces of the vehicle in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

As discussed herein, it is often desirable, or convenient, to transmit information visually to passengers and others in a high capacity passenger conveyance environment. For example, FIG. 1 is an exemplary illustration of a passenger vehicle 17 with final scenes 40a, 40b, 40c displaying information on the outside surfaces 42 of the vehicle 17. Final scenes 40a, 40b, 40c are projected on the outside surfaces 42 by implementation of an image projection system 10 (not shown on FIG. 1) as disclosed herein. While vehicle 17 is shown in FIG. 1 as an aircraft that is merely exemplary, and as used herein "vehicle" encompasses any conveyance capable of transporting passengers, and includes, but is not limited to, aircraft, spacecraft, watercraft, trains, subways, light rails, trucks, busses, automobiles, trams, monorails, streetcars, and the like.

Likewise, the size, shape, and location for the final scenes 40a, 40b, 40c shown in FIG. 1 are also exemplary and other sizes, shapes, and locations may be used as desired. The final scenes 40a-40c are for conveying visual information to passengers, vehicle crews, safety personnel, gate agents, passenger conveyance employees, or the like. A particular final scene 40 may include, but is not limited to, symbolic information (e.g., a logo, trademark, etc.), text (e.g., boarding instructions, route information, gate information, baggage claim, etc.,), aesthetic scenes (e.g., pictures, patterns, designs, etc.), safety information (e.g., warning symbols, hazard signs, etc.), passenger well-being messages (e.g., welcome messages, farewells, bon-voyages, etc.), or any other information that may be desirable, or convenient, to convey.

Figure 2:
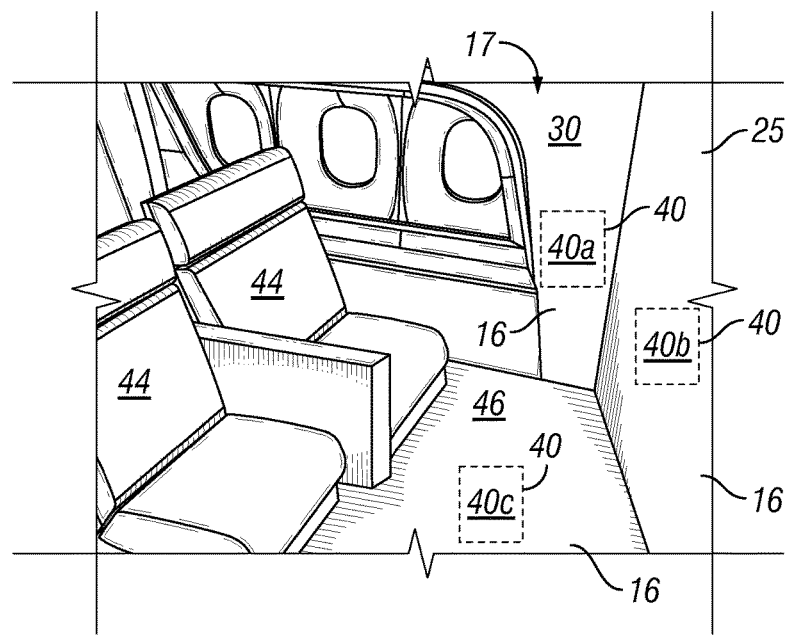
FIG. 2 is an exemplary illustration of the interior surfaces of a passenger vehicle showing final scenes in accordance with disclosed embodiments.

FIG. 2 is an exemplary illustration of the interior surfaces 16 of a vehicle 17 showing final scene 40 in accordance with disclosed embodiments. As shown, passenger vehicle 17 includes passenger seats 44 and one or more interior surfaces 16, such as bulkhead 25. In some vehicles 17, interior surfaces 16 may be curved or otherwise non-planar surfaces 30. As also shown, one or more final scenes 40 may be displayed on the interior surfaces 16. For example, final scene 40a is shown displayed on non-planar surface 30, final scene 40b is shown displayed on bulkhead 25, and final scene 40c is shown displayed on floor 46. Other interior surfaces 16, such as ceilings, doors, window covers, seats 44, etc., may also be used for final scene 40 display.

Figure 3:
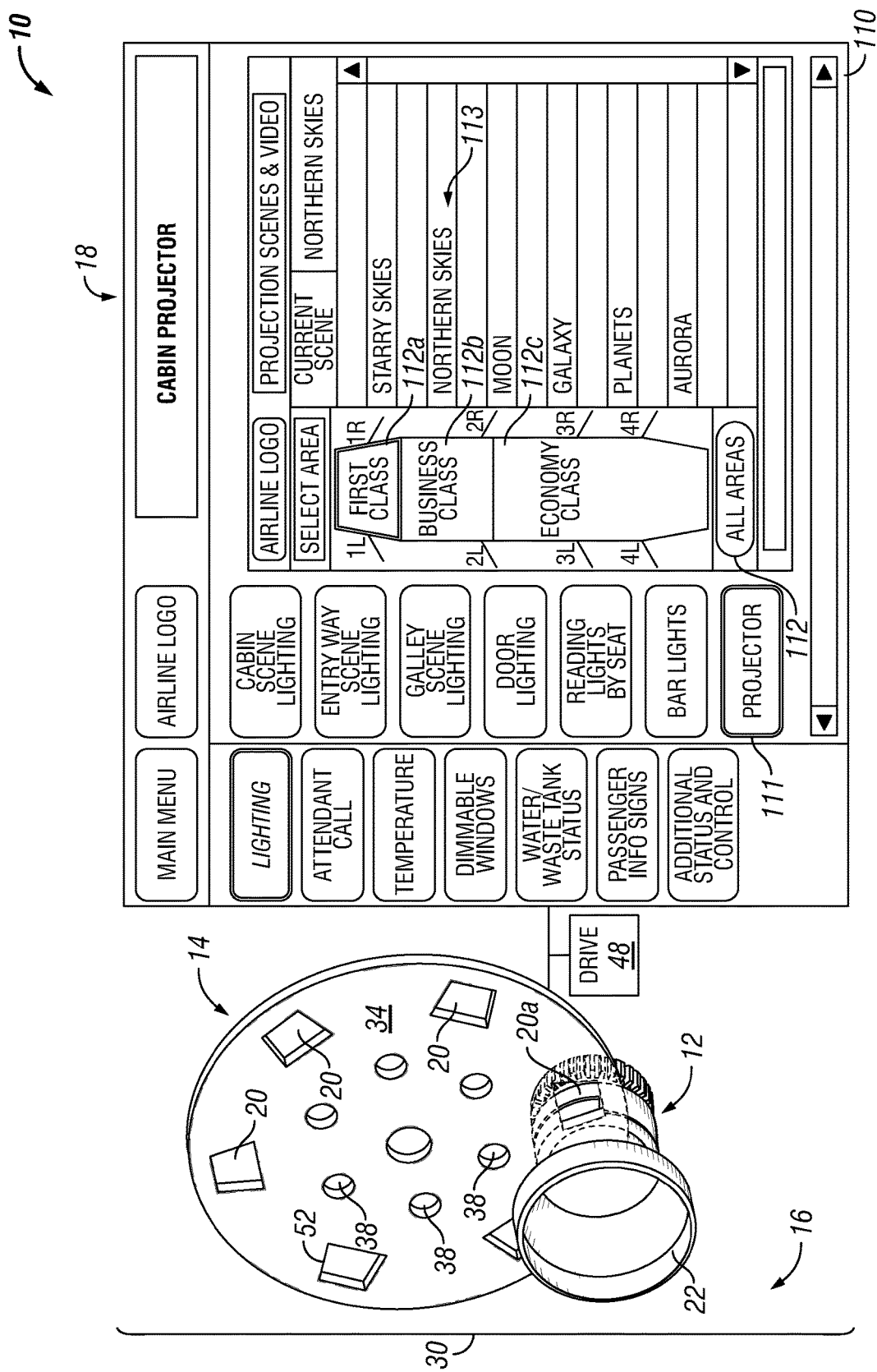
FIG. 3 is a schematic illustration of an image projection system in accordance with disclosed embodiments.

FIG. 3 is a schematic illustration of an image projection system 10 in accordance with disclosed embodiments. As shown, embodiments of image projection system 10 include a projector 12 having a lens 22. Embodiments of lens 22 may be tiltable, rotatable, or otherwise adjustable. In some embodiments, a gimble, or the like, (not shown) that is rotatable and/or tiltable may be included in the system 10 to facilitate positioning as disclosed herein. Embodiments of system 10 also include an interchangeable object slide holder 14, shown as an object disk 34 in FIG. 3, having one or more object slides 20 containing the images and/or information for the final scenes 40 that are displayed on the vehicle 17 surfaces, shown as non-planar surface 30 on interior surface 16 in FIG. 3. As also shown, embodiments of system 10 include an image management system 18 which, in some embodiments, may be part of a vehicle services system (VSS) that includes processor-controlled systems, controlled through a graphical user interface (GUI) such as control panel 110, or the like.

As also shown in FIG. 3, embodiments of system 10 may include object slides 20 each with a generally trapezoidal shape as indicated at 52 (e.g., an isosceles trapezoid) to counter Keystone effects (e.g., the distortion of the final scene 40 making the top of the projected image appear bigger than the bottom, or vice versa) when the final scene 40 is projected onto a non-planar surface 30. Other shapes for the object slides 20 may be used depending upon the relative geometry of the projector 12 to surfaces 16, 42 where the final scene 40 is to be displayed.

Embodiments of vehicle 17 may include a plurality of projectors 12 throughout the vehicle 17 capable of projecting a final scene 40 at various locations as disclosed herein. The operation of the projectors 12 and interchangeable object slide holder 14 is controlled at a control panel 110. Embodiments of the control panel 110 include an interface 111 that permits the selection of projectors 12 within the vehicle 17. For example, interfaces 112a, 112b, and 112c permit the operation of projectors 12 within a specified area of the vehicle 17. Embodiments of the control panel 110 may also include an interface 112 to permit the uniform operation of projectors 12 throughout the vehicle 17.

The final scenes 40 projected by the projectors 12 may be determined based on interface settings 113 on the control panel 110 operating in cooperation with a drive system 48, such as a rotary solenoid, motor, or the like that engages one or more index holes 38 to rotate a selected slide 20a into the projector 12. For example, the control panel 110 may be used to change the final scene 40 between various aesthetically pleasing object slides 20 with names indicating the subject matter such as, starry skies, northern skies, galaxy, planets, and arora. Various themes, interfaces, final scenes, and configurations may be included on the control panel 110 as would be appreciated by one of ordinary skill in the art having the benefit of this disclosure. The layout of the control panel 110 as shown in FIG. 3 is for illustrative purposes and may be varied as would be appreciated by one of ordinary skill in the art having the benefit of this disclosure.

Embodiments of the image projection system 10 may also be programmed to change final scene 40 upon occurrence of a trigger event. For example, the VSS and control panel 110 may include an automatic operation mode that includes input from other systems, such as altitude sensors, GPS sensors, or the like, to display a particular final scene 40 (e.g., a "fasten seatbelts" message or symbol) when the vehicle 17 descends to a predetermined altitude, passes a geographic point, or the like. Embodiments of the system 10 may change final scenes 40 upon the occurrence of the trigger by sending a signal, via the VSS, to a drive system 48 causing the interchangeable object slide holder 14 to advance to the pre-selected slide 20*a*. Of course, other trigger events, sensors, and final scenes 40 may be used.

As discussed above, embodiments of system 10 include a drive system 48 to position a selected slide 20*a* into the projector 12. Drive system 48 includes the components to selectively position the interchangeable optical slide holder 14 as desired. For example, for embodiments where interchangeable optical slide holder 14 includes an object disk 34, the drive system 48 may include a rotary, or linear, solenoid, motor, piezo-electric device, or other transducer that engages with index holes 38, or the like, on the object disk 34 to rotate, or otherwise move, the selected slide 20 into position in the projector 12.

Figure 4:
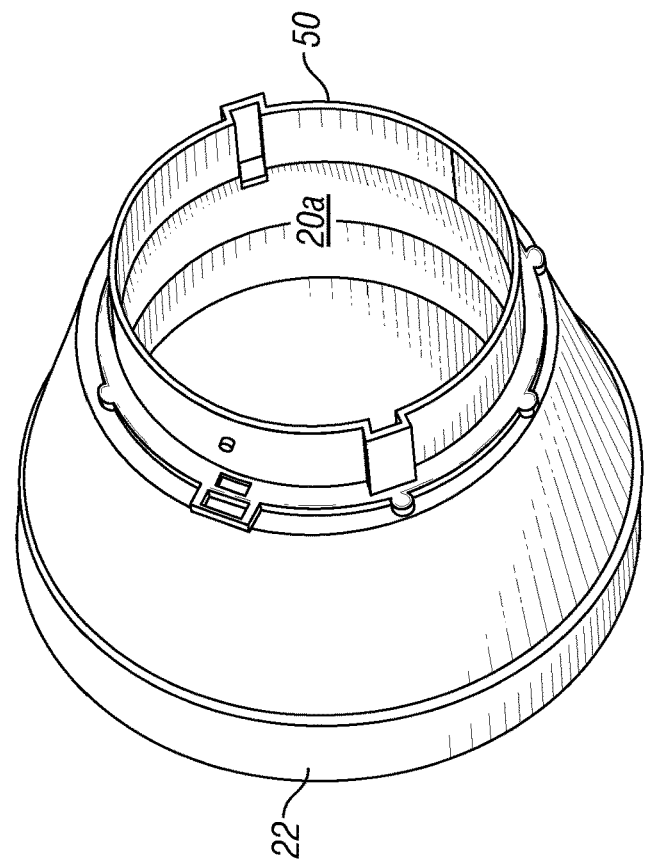
FIG. 4 is a rear, light-source, side view of an exemplary selected slide and lens assembly.

FIG. 4 is a rear, light-source, side view of an exemplary selected slide 20*a* and lens 22 assembly. As shown, embodiments of image projection system 10 may have individual selected slides 20*a* that couple with the lens 22 through a coupling ring 50, or the like. As disclosed above, lens 22 may be focusable and/or tiltable. Embodiments of system 10 may include one or more selected slides 20*a*, with a variety of scenes, symbols, or other information that may be coupled with the lens 22, via coupling ring 50, as desired.

Figure 5:
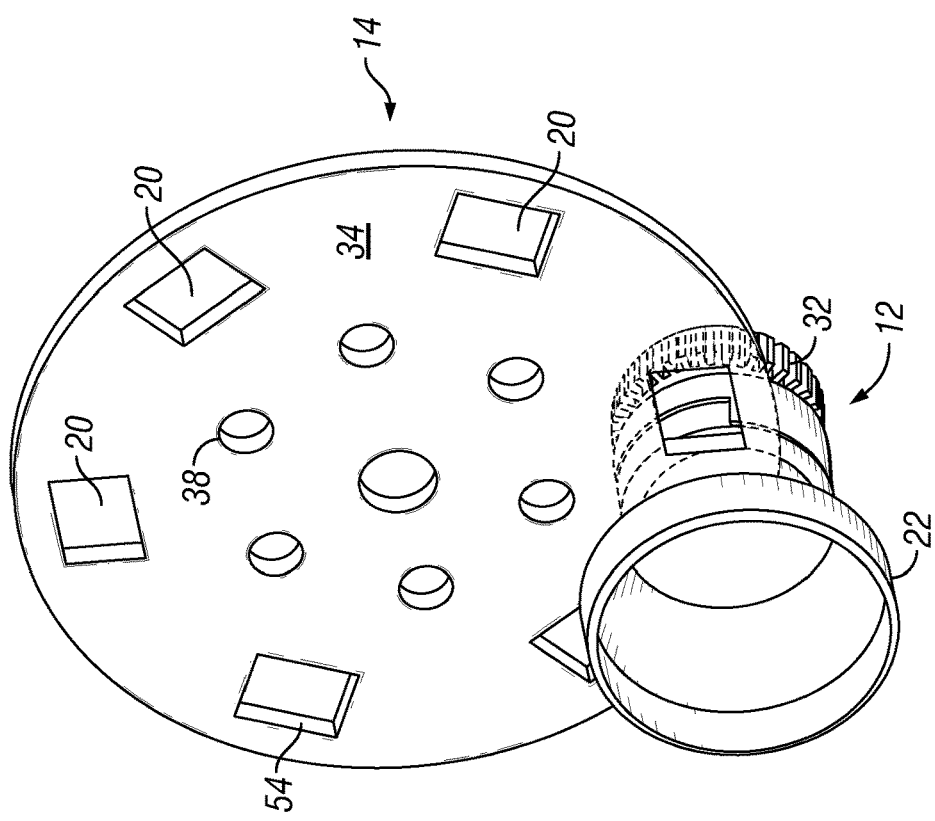
FIG. 5 is a schematic illustration of an image projection system in accordance with disclosed embodiments.

FIG. 5 is a schematic illustration of an image projection system 10 in accordance with disclosed embodiments. As shown, embodiments of the system 10 may include an object disk 34, or other interchangeable object slide holder 14, with object slides 20 that are generally rectangular in shape as indicated at 54. In other words, the object slides 20 in these embodiments are not shaped to counter Keystone effects. Instead, other counter measures are implemented as described below in connection with FIG. 6.

Figure 6:
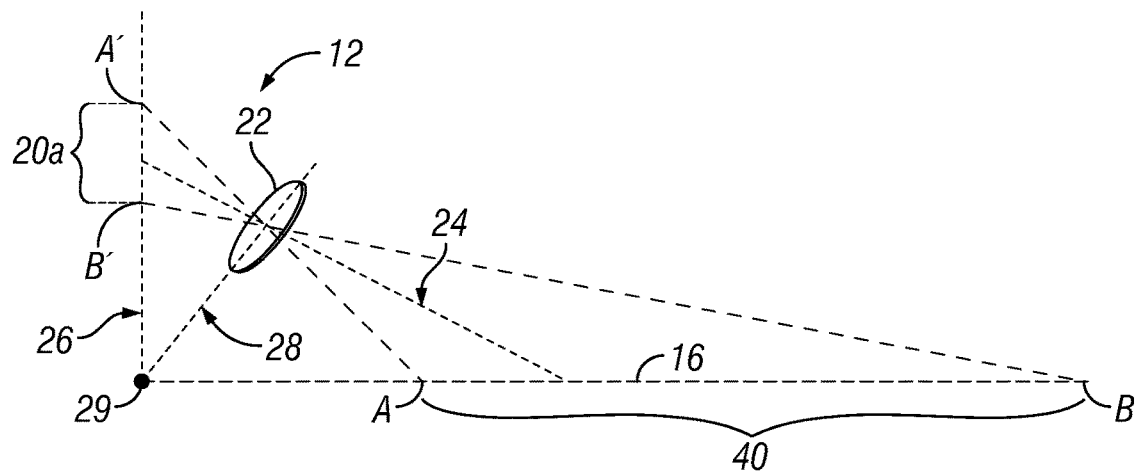
FIG. 6 is a schematic illustration of a projection system arranged to counter Keystone effects in accordance with disclosed embodiments.

FIG. 6 is a schematic illustration of a projection system arranged to counter Keystone effects in accordance with disclosed embodiments. As shown, lens 22 of projector 12 is arranged to project a final scene 40 (extending from A to B) from selected object slide 20*a* (extending from A' to B') onto a surface (e.g., interior surface 16). Lens 22 has a projection axis 24. The projector 12, lens 22, projection surface 16, and selected object slide 20*a* are arranged so that the plane 26 of the selected object slide 20*a*, lens plane 28 of lens 22, and the final scene 40 image plane on surface 16, all intersect at a common intersection point 29. For an image projection system 10 arranged as shown and described above, the Keystone effect (i.e., final scene 40 distortion) does not occur as it automatically gets corrected by the described configuration.

Figure 7:
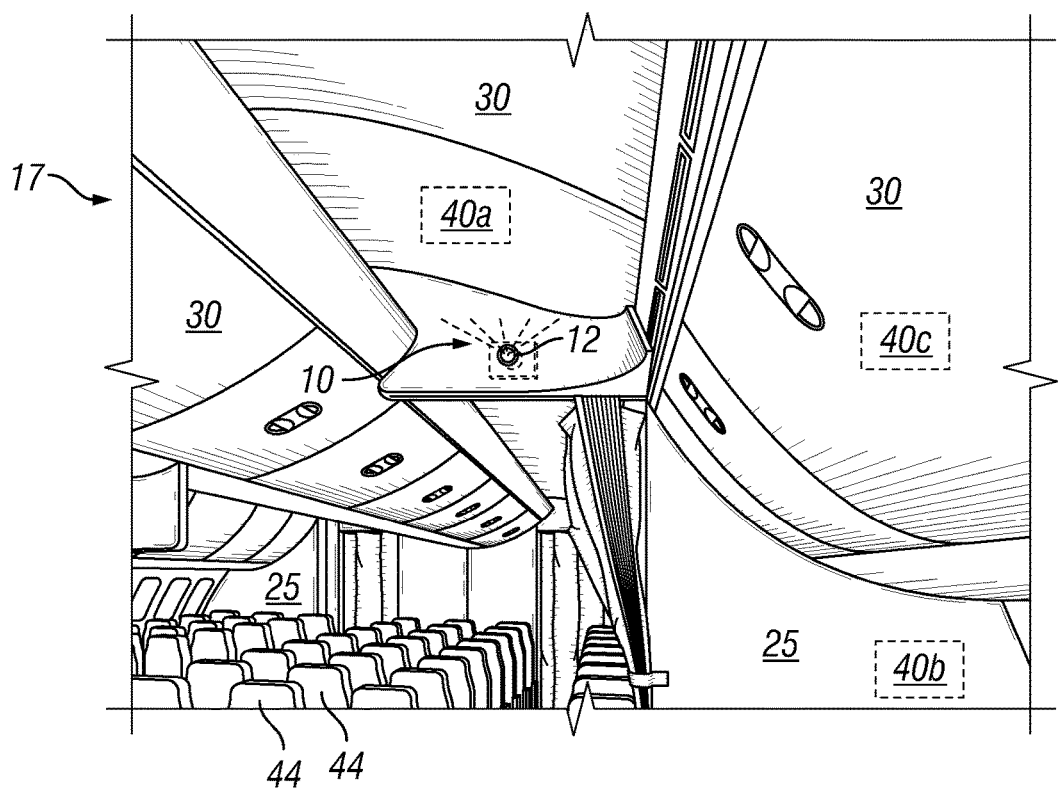
FIG. 7 is an exemplary embodiment of the disclosed image projection system employed on the interior of a vehicle.

FIG. 7 is an exemplary embodiment of the disclosed image projection system 10 employed on the interior of a vehicle 17. As shown, the interior of a vehicle 17 (in this example, an aircraft) has a number of bulkheads 25 and non-planar surfaces 30 upon which a final scene 40*a*, 40*b*, 40*c* may be projected. In the exemplary embodiment shown in FIG. 7, the projector 12 of the image projection system 10 is mounted near the ceiling of the vehicle 17. As disclosed herein, and as would be apparent to a person of ordinary skill having the benefit of this disclosure, other locations for projector 12 are also possible.

Figure 8:
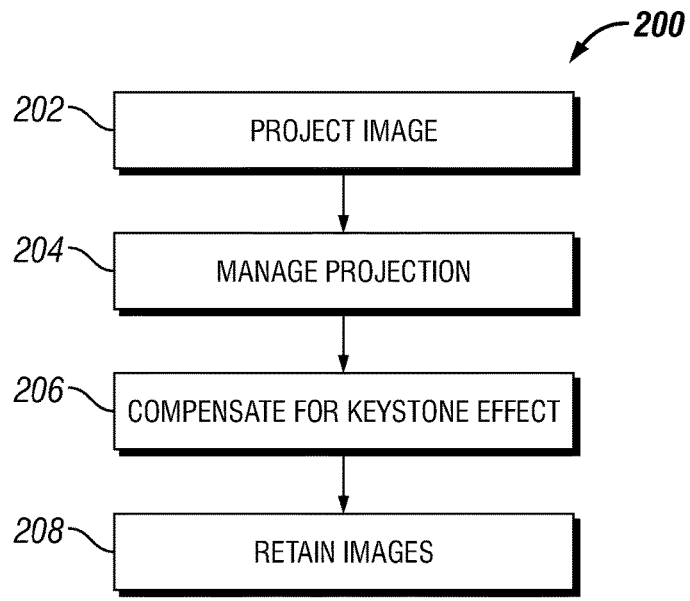
FIG. 8 is an exemplary schematic of a method for projecting a final scene in accordance with disclosed embodiments.

FIG. 8 is an exemplary schematic of a method 200 for projecting a final scene 40 in accordance with disclosed embodiments. As shown at step 202 the method 200 includes projecting an image (e.g., a final scene 40) by illuminating an object slide 20 with a projector 12 having an interchangeable optical slide holder 14 configured to adaptively focus the image onto a surface 16, 42 of a vehicle 17. The method 200 also includes step 204 managing the projecting with an image management system 18 associated with the projector 12. The image management system 18 is for selectively associating one object slide 20 at a time with the interchangeable optical slide holder 14 for projection of the selected slide 20*a* upon the surface 16, 42. As disclosed herein, at step 206 the system 10 may compensate for the Keystone effect by arranging a lens 22, configured to project with a projection axis 24 that is different from a plane 26 of the selected object slide 20*a* and a lens plane 28. As discussed in connection with FIG. 6, for substantially rectangular shaped 54 slides 20, the projector 12, lens 22, projection surface 16, 42 and selected object slide 20*a* are arranged so that a plane 26 of the selected object slide 20*a*, the lens plane 28 of lens 22, and the plane of the final scene 40 on a surface 16, 42 all intersect at a common intersection point 29. As also disclosed herein, compensation step 206 may also include using a substantially trapezoidal shaped 52 object slide 20 to compensate for the Keystone effect. Method 200 may also include, at step 208, retaining the object slides 20 in the image management system 18 in one of a linear sequence 36 or a recirculating sequence 34.

Figure 9:
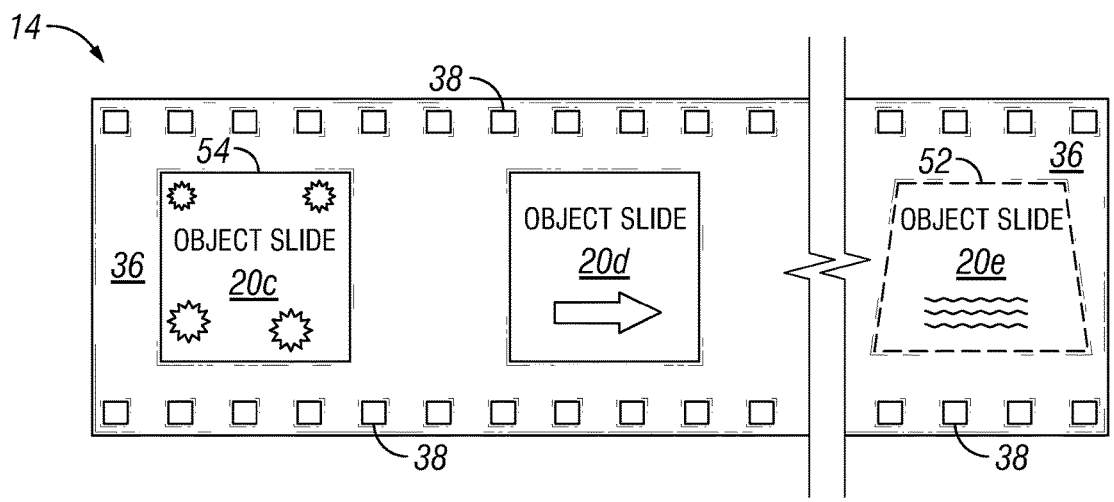
FIG. 9 is a schematic representation of a linear array for an interchangeable object slide holder in accordance with disclosed embodiments.

FIG. 9 is a schematic representation of a linear array 36 for an interchangeable object slide holder 14 in accordance with disclosed embodiments. As disclosed herein, one or more object slides 20*c*, 20*d*, 20*e* are provided in a linear array 36 on an interchangeable object slide holder 14. One or more index holes 38, or the like, are provided to allow a drive system 48 to position one of the slides 20*c*, 20*d*, 20*e* into the projector 12. For example, the drive system 48 may include a rotary, or linear, solenoid, motor, piezo-electric device, or other transducer that engages with index holes 38, or the like, move the selected slide 20*c*, 20*d*, 20*e* into position in the projector 12. As disclosed above, selection and movement of the interchangeable object slide holder 14 may be under control of an image management system 18, or the like. As also shown, object slides 20*c*, 20*d* may have substantially rectangular shapes 54, or as shown for object slide 20*e*, they may have substantially trapezoidal shapes 52 to counter Keystone effects.

Although various embodiments have been shown and described, the present disclosure is not so limited and will be understood to include all such modifications and variations are would be apparent to one skilled in the art.

The invention claimed is:

1. An image projection system, comprising:
   a projector having an interchangeable optical slide holder configured to adaptively focus an object slide onto a surface of a vehicle the interchangeable optical slide holder further comprising a lens having a projection axis that intersects at a common point with a plane of the selected object slide and a lens plane of the lens; and
   an image management system associated with the projector, the image management system for selectively associating one object slide at a time with the interchangeable optical slide holder for projection of a selected object slide upon the surface.

2. The image projection system of claim 1, wherein the interchangeable optical slide holder compensates for the Keystone effect.

3. The image projection system of claim 1, wherein the surface is one of a bulkhead and a non-planar surface, and wherein the vehicle is a high-capacity passenger conveyance.

4. The image projection system of claim 3, wherein the high-capacity passenger conveyance is one of an aircraft, spacecraft, watercraft, train, or bus.

5. The image projection system of claim 1, wherein the object slide comprises an undistorted image that is perceivable by a human prior to selection.

6. The image projection system of claim 1, wherein the image management system retains object slides in one of a linear sequence or a recirculating sequence.

7. The image projection system of claim 1, wherein the object slide comprises an image that is generally rectangular in shape.

8. A method of projecting an image, the method comprising:
projecting an object slide with a projector having an interchangeable optical slide holder configured to adaptively focus the object slide onto a surface of a vehicle the interchangeable optical slide holder further comprising a lens having a projection axis that intersects at a common point with a plane of the selected object slide and a lens plane of the lens; and
managing the projecting with an image management system associated with the projector, the image management system for selectively associating one object slide at a time with the interchangeable optical slide holder for projection of a selected object slide upon the surface.

9. The method of claim 8, further comprising:
compensating with the interchangeable optical slide holder for the Keystone effect.

10. The method of claim 8, wherein the surface is one of a bulkhead and a non-planar surface, and wherein the vehicle is a high-capacity passenger conveyance.

11. The method of claim 10, wherein the high-capacity passenger conveyance is one of an aircraft, a spacecraft, a watercraft, a train, and a bus.

12. The method of claim 8, wherein the object slide comprises an undistorted image that is perceivable by a human prior to selection.

13. The method of claim 8, further comprising:
retaining the object slides in the image management system in one of a linear sequence, or a recirculating sequence.

* * * * *